(12) United States Patent
Hohnstadt et al.

(10) Patent No.: US 6,351,998 B1
(45) Date of Patent: Mar. 5, 2002

(54) METHOD FOR DESIGNING A LOAD CELL

(75) Inventors: Frederick P. Hohnstadt, Clarkston; John D Davis, Milford, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/665,558

(22) Filed: Sep. 19, 2000

(51) Int. Cl.[7] .............................................. G01N 19/00
(52) U.S. Cl. ...................................................... 73/804
(58) Field of Search ........................ 73/794, 795, 804, 73/806

(56) References Cited

U.S. PATENT DOCUMENTS

| | | | |
|---|---|---|---|
| 4,567,774 A | * | 2/1986 | Manahan et al. ............. 73/826 |
| 5,492,002 A | * | 2/1996 | Higgins et al. |
| 5,569,857 A | * | 10/1996 | Miyazaki .................... 73/785 |

* cited by examiner

*Primary Examiner*—Max Noori
(74) *Attorney, Agent, or Firm*—Laura C. Hargitt

(57) ABSTRACT

A method for designing load cells of articles, such as for example vehicle components. A computer model utilizes vehicle components as flexible members that are built and loaded mathematically such that the output can be used to determine the best location to lay the strain gages on the article based upon their corresponding Wheatstone bridge output. A suitable Finite Element Model (FEM) of the component to be instrumented is provided. This model is then loaded with the same loads the component will see in practice. Each load is independently applied to the model and the results from each load are saved. The Finite Element Analysis results needed by the present invention are the maximum and minimum principal strains and principal strain angle for each valid finite element in the model. These results along with the strain gage properties and some user preferences provide input data for assessing every usable combination of elements in the FEM for sensitivity to primary loads and cross-talk of off-axis loads. The element combinations are then listed in order of decreasing sensitivity within a user specified cross-talk tolerance, and displayed to the user. The gages are laid and the load cell is completed and calibrated.

18 Claims, 4 Drawing Sheets

METHOD FOR DESIGNING A LOAD CELL

TECHNICAL FIELD

The present invention relates to a method of designing load cells with unmodified vehicle components as the flexible member of the load cell.

BACKGROUND OF THE INVENTION

Load cells are made by gluing strain gages to a flexible member and wiring the strain gages into a Wheatstone bridge. When the member is loaded and flexes, the gage resistance changes and the Wheatstone bridge output changes. When this output correlates well to the primary load, the flexible member becomes a load cell.

The traditional method used for collecting vehicle loads is to cut and re-fabricate the vehicle component so an off-the-shelf load cell can be installed. In some cases an instrumented bolt can be used to collect loads through a joint. If a component is very simple in shape, sometimes it can be made into a load cell using traditional "mechanics of materials" knowledge or experience to determine a strain gage location and orientation.

Cutting and re-fabricating a vehicle component changes the stiffness of the vehicle in the area around the load cell, causing the collected data to be from a non-representative cobbled vehicle. This change in vehicle stiffness will change the loads and frequency content seen at the load cell. Likewise an instrumented bolt changes the stiffness of the joint through which the load of interest is reacted. Again, changing the stiffness changes the load. Using traditional mechanics to design a load cell can be a time consuming trial and error process. It also will only result in an optimal load cell if the designer is very lucky.

Software is available from several companies to design standard load cells. However, no software exists that can design a load cell out of a vehicle component based upon a Finite Element Analysis model.

What is needed is a process that can design a load cell out of a vehicle component. By making load cells directly out of vehicle components, the integrity of the component and surrounding hardware is not changed or compromised, which is ideal for the testing of vehicles put into customers hands, barrier vehicles, and data acquisition vehicles.

SUMMARY OF THE INVENTION

The present invention is a process for designing load cells with articles, as for example unmodified motor vehicle components, as the flexible member of the load cell. The present invention is implemented as a computer program utilizing vehicle components as flexible members that are virtually built and loaded using Finite Element Modeling simulation. The resulting output can be used to determine the best location to lay the strain gages on the vehicle component based upon their corresponding Wheatstone bridge output. This information can be used to determine the quality of a load cell that a certain flexible member will make before any strain gages are actually glued to the article.

The present invention described herein involves loading a Finite Element Model of the article desired to be used for a load cell, and using the model's output therefrom to design the load cell. This process assumes that a strain gage will be laid at an individual element location at a specific orientation relative to the principal strain angle by which the strain gage sees the principal strain in the given element. In this process, combining the strain gage output from multiple elements in the model makes a mathematical transducer. The correct set of elements are chosen by searching every possible combination of elements in the model and determining their Wheatstone bridge output for a given input load. Elements are selected which produce high output with respect to the primary load of interest and low output due to off axis (cross-talk) loads. The element combinations are then listed in order of decreasing sensitivity within a user specified cross-talk tolerance, and displayed graphically to the user. The user may select the element combinations that look the most promising and get additional information on them. Information available includes a Mohr's circle diagram graphically depicting the different loadcases and an indication of how sensitive the location is to strain gage placement. Once a location is chosen, the elements are indicated on a picture of the model, which is printed out to assist in actual strain gage placement. The gages are laid and the load cell is completed and calibrated.

Accordingly, it is an object of the present invention to provide a method for utilizing vehicle components as flexible members that are built and loaded mathematically such that the output can be used to determine the best location, and orientation to lay the strain gages on the vehicle component based upon their corresponding Wheatstone bridge output.

DETAILED DESCRIPTION OF THE PREFERRED EMBODIMENT

Transducers are devices used to measure physical inputs, for example loads imparted onto an article. Often, however, the nature of the structure or test does not lend itself to installing an off-the-shelf transducer. In many cases, a suitable transducer can be made from the article itself with proper arrangement of strain gages wired to form a Wheatstone bridge from which the output is designed to isolate a particular load of interest. For a complex component, optimum strain gage locations are non-intuitive; therefore, the present invention was developed to determine the optimum topological location and orientation for the placement of such strain gages.

Input

First, a suitable Finite Element Model (FEM) is loaded with unit loads along the same axis as loads the part will see in service. Each load is independently applied to the model and the results from each load are saved. The present invention reads each valid element's maximum and minimum principal strain (also called principal major and minor strains), and principal strain angle (the angle between the principal axes and the x and y reference axes). These results along with strain gage type, gage factor, nominal gage resistance, Wheatstone bridge excitation voltage, number of bridge arms, and cross-talk tolerance are used as input data for the present invention. After this information is supplied, the present invention assesses every usable combination of elements in the FEM through a calculated Wheatstone bridge output for sensitivity to primary loads and cross-talk of off-axis loads.

Finite Element Model

Figure 4:
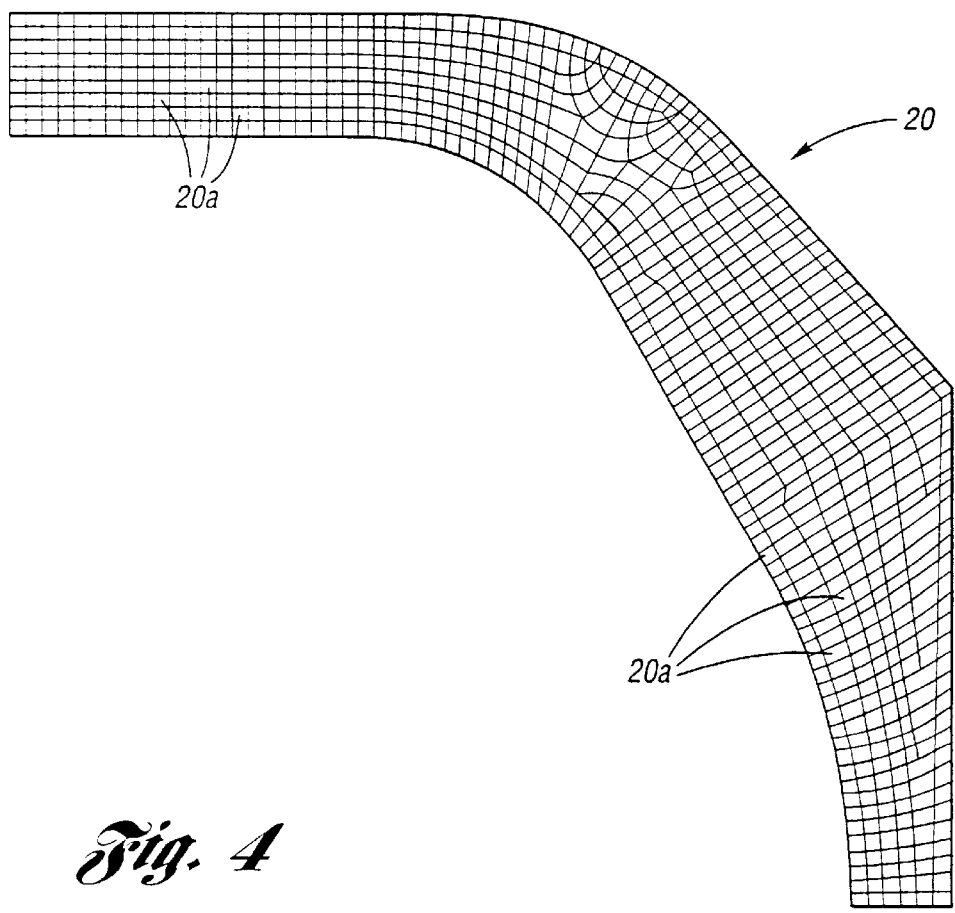
FIG. 4 is an example of a Finite Element Model (FEM) generated according to the present invention for the body mount bracket of FIG. 3.

Finite element analysis technique is used to develop a Finite Element Model (FEM) an article desired to be used for a load cell. The FEM is comprised of hundreds of small finite elements that cover the article being modeled, for example finite element 20a of an FEM 20 as shown at FIG. 4. These finite elements should measure about five to ten millimeters along each side of a rectangle (approximately the size of a strain gage). If gages cannot be placed on certain areas of the article, elements in these areas can be blocked off in the model.

This model is then loaded with the same loads the article will see in service. Each load is independently applied to the model and the results from each load are saved. Every load the article sees needs to be entered in a separate loadcase (i.e. vertical load, lateral load, fore/aft load, etc.). The FEM must include the primary load of interest and all cross-talk loads in separate loadcases. The Finite Element Analysis (FEA) output, obtained by running a linear static analysis on the FEM, contains the principal strains and principal strain angle from every element in the FEM for the given loadcase.

Wheatstone Bridge

Figure 1A:
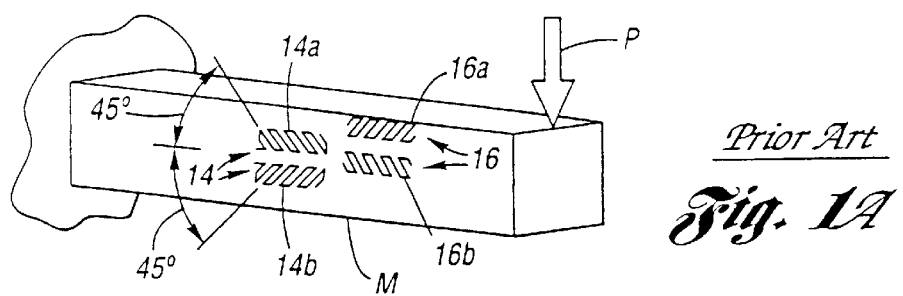
FIG. 1A is a perspective view of an example of a prior art strain gage transducer, shown in operation.
Figure 1B:
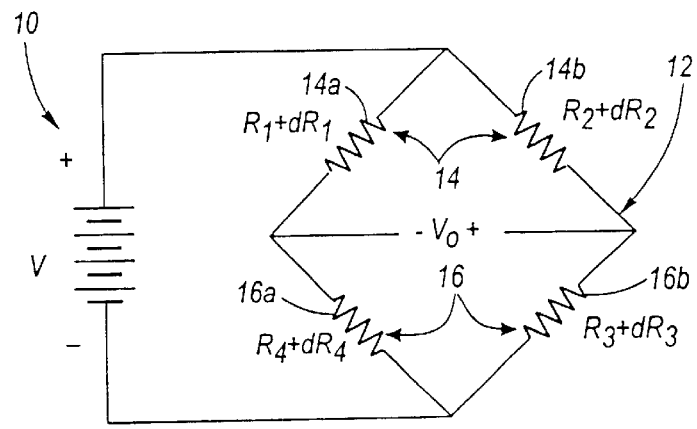
FIG. 1B depicts an example of a prior art four-arm Wheatstone bridge transducer wiring diagram.

A typical strain gage transducer 10, employing a four-arm Wheatstone bridge 12, as shown in FIGS. 1A and 1B, utilizes the change in resistance $dR_1$, $dR_2$, $dR_3$, and $dR_4$ of individual strain gage grids 14a, 14b, 16a, 16b of strain gages 14 and 16, are glued to a member M to produce a proportional electrical output signal $V_O$ in response to a load P applied to the member. The change in resistance dR, such as $dR_1$, $dR_2$, $dR_3$, or $dR_4$, of grids 14a, 14b, 16a, or 16b of a strain gage 14 or 16 is related to strain according to:

$$dR = GF*e*R \quad (1)$$

and the output voltage $V_O$, for a four arm Wheatstone bridge, is given for the general case by:

$$V_O = V*[(R_1+dR_1)/(R_1+dR_1+R_4+dR_4)(R_2+dR_2)/(R_2+dR_2+R_3+dR_3)])$$

and for the special case where R1=R2=R3=R4=R by, $$V_O = V*[(R+dR_1)/(2R+dR_1+dR_4)-(R+dR_2)/(2R+dR_2+dR_3)], \quad (2.2)$$

wherein, GF is the gage factor of the strain gage 14 or 16, e is the strain along the strain gage grids of the strain gage 14 or 16, R is the nominal resistance $R_1$, $R_2$, $R_3$, or $R_4$ of the strain gage 14 or 16, dR is the change in strain gage resistance $dR_1$, $dR_2$, $dR_3$, or $dR_4$ due to the strain e, and V is the supply voltage to the Wheatstone bridge 12.

Note that if all dR values are equal, no output voltage, $V_O$, will result. Additionally, if $dR_1=dR_2$ and $dR_3=dR_4$, or, if $dR_1=dR_4$ and $dR_2=dR_3$, no output voltage, $V_O$, results. All other changes in resistance $dR_1$, $dR_2$, $dR_3$, or $dR_4$ (strain along the gages 14 or 16) will produce some amount of output voltage $V_O$. It is this unique characteristic that enables one to efficiently design a transducer 10 that will maximize the desired output voltage $V_O$ due to the desired load while minimizing the output voltage $V_O$ due to unwanted or cross-talk loads.

The present invention utilizes FEA maximum and minimum principal strain, and principal strain angle results to determine the optimum placement of these gages 14 and 16 on a part to measure a desired load of interest. A strain gage is oriented so that its grids (i.e. 14a, 14b, 16a, 16b) are either aligned along an element's direction of maximum principal strain or minimum principal strain resulting from a primary load. An element's maximum principal strain resulting from a primary load of interest is used to calculate strain gage resistances $dR_1$, and $dR_3$ in equation 2.2. Minimum principal strains resulting from a primary load of interest are used to calculate strain gage resistances $dR_2$ and $dR_4$ in equation 2.2.

As mentioned above, an issue of importance in load cells is the sensitivity to off-axis loads; that is, loads along an axis orthogonal to the input load described above. The Wheatstone bridge output produced by these off-axis loads is called cross-talk. Cross-talk is predicted by the present invention using the FEA results produced by off-axis and primary loads. The principal strains due to cross-talk loads must be transposed onto the axis on which the strain gages are laid to determine the output generated by the strain gages and, thus, the Wheatstone bridge output.

The principal strain angle difference, $\Theta$, from an element's principal strain angle resulting from a primary load and cross talk load is used to calculate the element's strain produced from the cross talk load along the respective strain gage grids according to equation:

$$\text{Cross talk strain } 1 = (e_{max}+e_{min})/2+((e_{max}-e_{min})/2))*\cos(2*\Theta)(2.3)$$

$$\text{Cross talk strain } 2 = (e_{max}+e_{min})/2+((e_{max}-e_{min})/2))*\cos(2*(\Theta-90)) $$

Where 'Cross talk strain 1' is the strain along an elements maximum principal axis of the primary load due to the cross talk load and 'Cross talk strain 2' is the strain along an elements minimum principal axis of the primary load due to the cross talk load. Variables $e_{max}$ and $e_{min}$ are an element's maximum and minimum principal strains due to cross-talk loads respectively. 'Cross talk strain 1' is used to calculate $dR_1$ and $dR_3$ while 'Cross talk strain 2' is used to calculate $dR_2$ and, $dR_4$ respectively as shown in equation 1. Next equation 2.2 is used to predict the Wheatstone bridge output due to cross talk loads.

A high output voltage $V_O$ due to the primary load of interest, and a low output voltage $V_O$ due to cross-talk loads is desired. Finite Element Analysis and Wheatstone bridges are well known to those skilled in the art.

Flow Chart

Figure 2B:
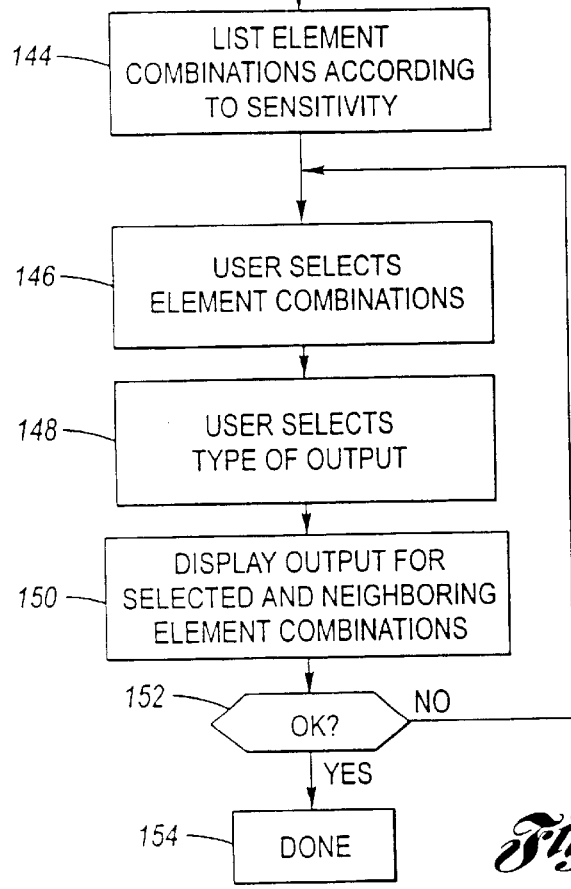
FIG. 2 depicts a process flow chart of the preferred environment of use of the present invention.
Figure 2A:
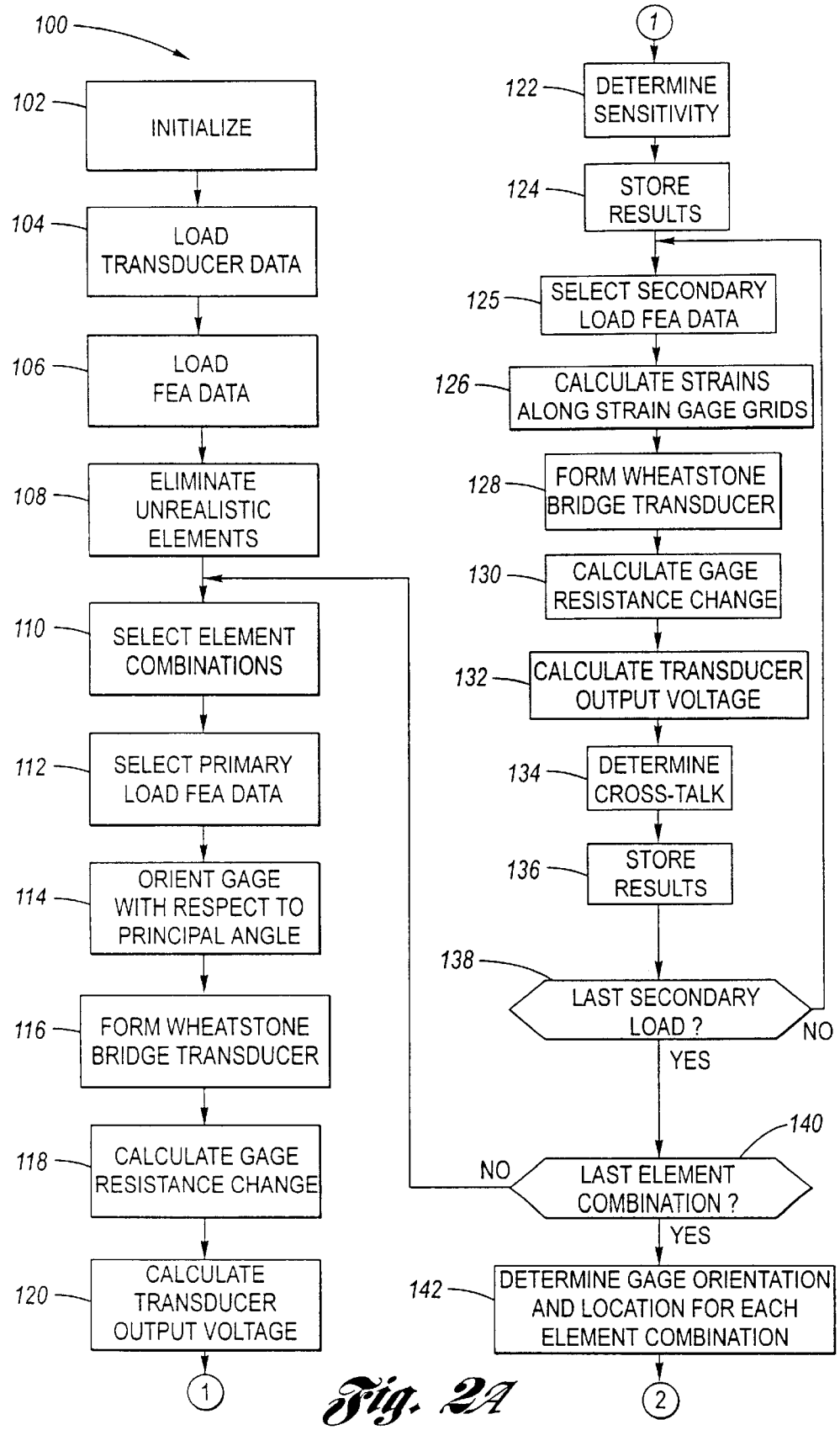

FIG. 2 depicts a flow chart 100 of the preferred environment of use of the present invention. Initialization occurs at block 102 and includes user specified cross-talk criteria. Transducer properties are input at block 104 and FEA data are loaded at block 106. Unrealistic elements due to location, type of gage, or other criteria are eliminated at block 108 and the first element combination is selected at block 110. The FEA data for the primary load is selected in block 112 and the strain gage is oriented with respect to the principal strain angle at block 114 according to the FEA data. A mathematical Wheatstone bridge transducer is formed at block 116. The gage resistance change from the FEA and transducer data is calculated at block 118 according to equation (1) and the output voltage $V_O$ is calculated at block 120 according to equation (2.1) (or, if applicable, more simply from equation (2.2)) whereby the sensitivity is determined at block 122 and the results stored at block 124. The FEA data for a secondary (off-axis) load is selected in block 125 keeping the strain gage in its previous orientation with respect to the principal strain angle at block 114 according to the FEA data. Strains along strain gage grids from block 114 are then calculated at block 126 using equations 2.3 and 2.4. A mathematical Wheatstone bridge transducer is formed at block 128. The gage resistance change from the FEA and transducer data is calculated at block 130 according to equation (1) and the output voltage $V_O$ is calculated at block 132 according to equation (2.1) (or, if applicable, more simply from equation (2.2)) whereby the cross-talk is determined at block 134 and the results stored at block 136. If the last secondary load has been selected, decision block 138 passes control to block 140. Otherwise, control passes to block 126. If the last element combination has been selected, control passes to block 142. Otherwise, control passes to block 110. Gage orientation and location for each element combination is determined at block 142 from the FEA data and the element combinations are listed in block 144 according to sensitivity with their corresponding cross-talks. The user selects element combinations of interest at block 148. Selected and neighboring element combinations are then displayed at block 150. If the user is satisfied with the results at block 152 then the process terminates at block 154. Otherwise, control passes to block 146.

EXAMPLE

Figure 3:
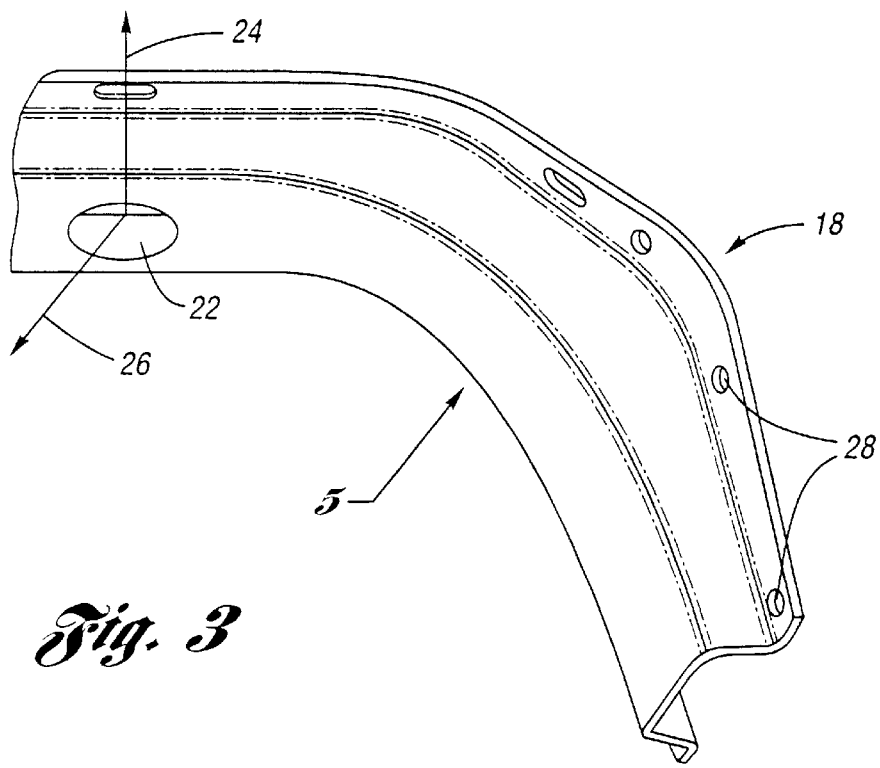
FIG. 3 is an example of a body mount bracket.

To illustrate the present invention, an article in the form of a medium duty truck body mount bracket 18, as shown at FIG. 3, will be reviewed. The body mount bracket 18 is in the form of a curved cantilever beam which is attachable to a side of a vehicle body frame rail via a mounting 22 located at a free end of the body mount bracket. The goal is to measure the vertical load 24 through the mounting 22 without obtaining erroneous loads due to fore-aft inputs 26 at the mounting. Traditionally, these loads 24 and 26 would have been measured by raising the vehicle body up one inch to allow a load cell to be placed between the body and the body mount bracket 18. This approach degrades the integrity of the joint between the body mount bracket 18 and the body at the mounting 22, and it provides distorted data due to the body being an inch higher than normal. Using the present invention, the body mount bracket 18 will be transformed into a load cell without physically changing the vehicle.

The first step in the process is to obtain a Finite Element Model (FEM) of the body mount bracket 18 using FEA. The body mount bracket 20 is constrained at the framerail attachment holes 28, and then loaded with two individual loadcases; first, a vertical load 24 applied at the mount attachment 22 and second, a fore-aft load 26 applied at the mount attachment. The FEA is then run and the principal strains and the principal strain angles are collected for every element for each of the two load cases 24 and 26, thereby providing an FEM 20, composed of a multiplicity of finite elements 20a, as shown at FIG. 4. Note, the present invention utilizes the principal strains of each element, not the maximum stress. Maximum stress is meaningless for strain gage placement. This is a key difference between the analysis performed by the present invention and traditional finite element analysis. After running the FEM with a linear static FEA, the results are then processed by the present invention.

The invention is then initialized as shown in block 102 and the user input the allowable maximum cross talk percentage. The present invention can make a load cell using single gages, shear gages, bending gages or axial gages, as specified by the user. In block 104 transducer data is selected. For this example, shear gages are selected. A four arm Wheatstone bridge is selected. A gage factor is 2.0, and a shunt resistance of 100,000 ohm is then selected. The vertical load case is also selected as the primary load.

This example uses a four-arm Wheatstone bridge with two shear gages which requires the present invention to find a pair of elements. The same approach can be used to build a four-arm Wheatstone bridge with four single (or individual) strain gages, requiring the present invention to find four suitable elements instead of two, but using a similar yet expanded search method for accomplishing this. Two of the single gages lie along their elements maximum principal strain and two of the single gages lie along their elements minimum principal strain. This same approach can also be implored to build an eightarm arm bridge, sixteen-arm bridge or any other size bridge by expanding the search for the correct number of suitable elements.

Figure 5:
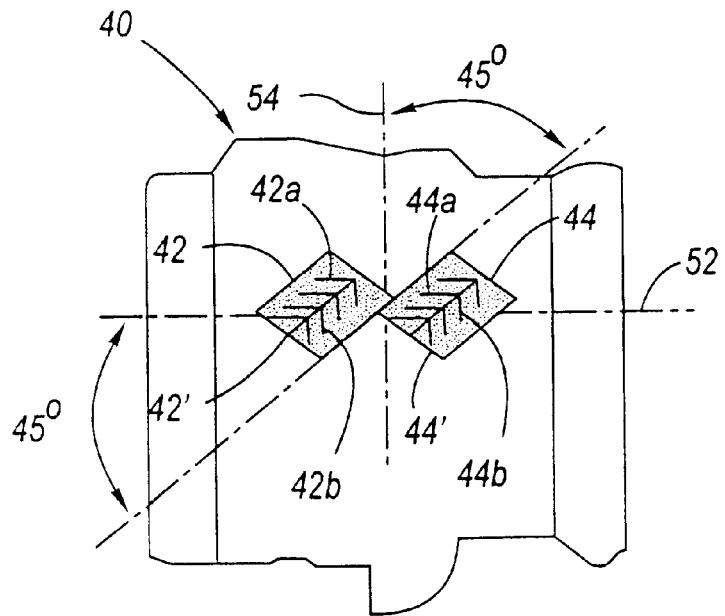
FIG. 5 shows an example of a load cell formed from the FEM of FIG. 4 for the body mount bracket of FIG. 3, seen at an orientation with respect thereto along arrow 5.
Figure 6:
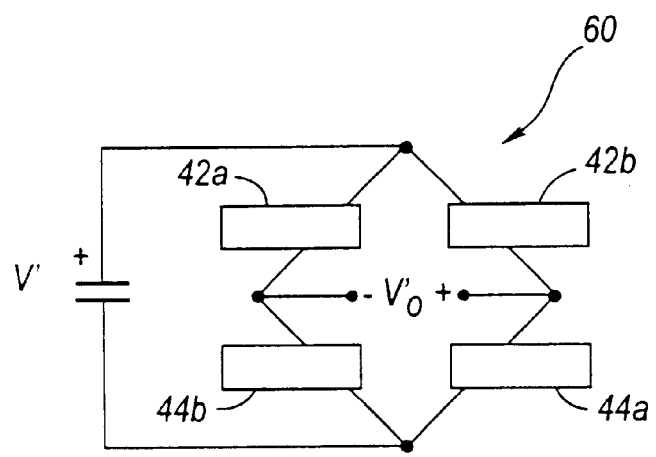
FIG. 6 is an example of an electrical circuit for a mathematical Wheatstone bridge transducer according to the present invention.

As depicted in FIG. 5, a load cell 40 is comprised of two shear gages 42 and 44, properly wired into a four-arm Wheatstone bridge 60, as shown at FIG. 6. Each shear gage 42 and 44 contains two grids 42a, 42b and 44a, 44b mounted to the gage at 90 degrees relative to each other.

FEA results data is next loaded into the program as in block 106. This invention uses the strain results from the FEA that contains the two load cases to begin the process of finding the ideal strain gage location for a load cell. Block 108 is used to eliminate elements that are located in places difficult to lay a strain gage. Additionally this is used to eliminate elements that are not predominately in a state of shear due to the primary load case. Block 110 starts by selecting an element combination to be used for Wheatstone bridge calculations. The shear gage 42 or 44 is mounted through this simulation to the body mount bracket 18 so that one grid 42a or 44a lies along the axis of maximum principal strain 52, and the other grid 42b or 44b lies along the axis of minimum principal strain 54 as described in block 114.

FIG. 6 depicts the wiring diagram of a shear gage load cell 40 using the Wheatstone bridge 60 as in block 116. When a member with a strain gage flexes, the material experiences strain which causes the strain gage to stretch or compress. In this example, grid 42a of strain gage 42 and grid 44a of strain gage 44 are stretched while grid 42b of strain gage 42 and grid 44b of strain gage 44 are compressed. This increases or decreases, respectively, the resistance of the strain gage grids 42a, 42b and 44a, 44b as described in block 118. Block 120 is then initiated which calculates the output of the Wheatstone bridge 60.

As previously mentioned, elements, such as 42' and 44' in FIG. 5, in a finite element model are roughly the size of a strain gage 42 or 44 so this process assumes each element, such as 42' or 44', represents a possible strain gage location. A load cell 40 is defined in the model by placing a mathematical "shear gage" 42 on one element 42' in the model oriented at 45 degrees to the principal axis 52 of that element so that the strain gage grids are aligned along the principal axis and combining it with a mathematical "shear gage" 44 on a second element 44' in the model also oriented at 45 degrees to the principal axis of the second element. These two mathematical shear gages 42 and 44 are mathematically "wired" together into a Wheatstone bridge configuration 60 which will give an output $V_O'$ for a given input strain to the shear gages. The ratio of this output $V_o'$ to the applied primary input load, such as the vertical load 24 of FIG. 3, is the sensitivity of this load cell 40 as described in block 122. The input strain is the strain in these two gages caused by the vertical load 24 applied to the bracket 40. The present invention makes a load cell using every possible element pair in the model and determines the sensitivity of each load cell trial. This sensitivity information is stored, block 124, and can be sorted to find the ideal pair of elements for a load cell.

The ideal load cell is not chosen solely on the basis of good sensitivity, but also on the amount of cross-talk it produces. Cross-talk is defined as the amount of output from a loadcell as a result of an off-axis applied load. In the above example, the cross-talk, due to the applied fore/aft load 26, for each pair of elements stored, such as 42' and 44', will be calculated as described in blocks 126 through 134. For every stored entry, both strain gages, such as 42 and 44, were laid on the body mount bracket 18 at a specific orientation, based on the principal strain axis 52 in the element 42' or 44' due to the vertical load 24. Now, the amount of strain seen by that same strain gage due to the fore/aft load 26 needs to be calculated. This is done by determining the magnitude and direction of strain in the elements 42' and 44' due to the fore/aft load 26, and then calculating how much of that strain is seen along the axis 52 of the strain gages 42 and 44 using equations 2.3 and 2.4. The strain seen by the strain gage 42 and 44 is then used to calculate the resistance change of the gage and the output $V_o'$ of the Wheatstone bridge 60 as described earlier. The ratio of this output $V_o'$ to the input fore/aft load 26 is the cross-talk of the given element combination 42' and 44', as shown block 134. It is stored along with the sensitivity as in block 136. For this example blocks 138 and 140 are No. The program then goes on to block 142 to calculate results for every valid element combination.

Element Selection

The user specified the allowable cross-talk from all secondary loads back in block 102. The present invention discards elements pairs which do not meet the maximum allowable cross talk percentage, and then returns the actual sensitivity and cross-talk values for element combinations that meet the users specifications, as described in block 144. The present invention also provides the user the ability to select a pair of elements, as in block 146, off the list and get more information about them. The present invention provides a Mohr's circle representation of the primary load and all off-axis loads for a given load cell. This helps an engineer "see" the loading in the load cell as described in block 148. The present invention can also show how sensitive a given strain gage location is to gage placement by calculating the cross-talk of neighboring elements as in block 150. If a location is very sensitive, it may not be ideal for a load cell, since the gage may not be able to be placed exactly on that location. This invention shows the user where to lay the strain gages and how to orient them on the component and, further, can display this information on the model for viewing. The user selects one combination and can either look at the Mohr's circle for the set of elements, look at a wiring diagram, or write the results to a modified FEA file. This information can be viewed in FEM software and the strain gage locations and orientations will show up on the model.

Printouts of the model showing the gage location and the wiring diagram show where and how to lay the gages on the article intended to be used for a load cell. Once the gages are laid and wired and the transducer is calibrated, the article becomes an optimized load cell transducer that measures the desired load without modifying any components.

Application

This technique has been successfully applied to several articles in the form of motor vehicle components, including exhaust hangers, steering knuckles, body mounts and wheels. It has proven especially beneficial for applications where vehicle modifications are not permitted.

The present invention has an additional capability associated with correlating Finite Element Models. The sensitivity and cross-talk values returned by the present invention for a given component should match the actual sensitivity and cross-talk values measured from the instrumented component during calibration. If the predicted values returned by the present invention and the experimental values measured from the instrumented component during calibration don't agree, either the gages were laid in the wrong spot, which can be visually verified, or the model is incorrectly loaded, constrained, or meshed. This provides a means of checking small component models and the loading associated with them.

SUMMARY

The following summarizes the process. Apply a load to the model. The load causes some strain in every element of the model. This strain is a maximum at some angle (principal strain angle). Lay a strain gage on the element at a specific orientation relative to the principal strain angle so that the grids on the strain gage align with an axis through the principal strain angle. The resistance of the strain gage will change by a certain amount from nominal depending on the strain seen by the element. Wire the strain gages from a set of elements together into a Wheatstone bridge. Determine the sensitivity of the load cell, defined as the ratio of the output of the Wheatstone bridge to the input load applied. With the gages on the elements in the same orientation as above, calculate the strain seen by the gages as a result of a cross-talk load applied to the part. Determine the output from the Wheatstone bridge due to this load. The ratio of this output to the input cross-talk load is the cross-talk for this load cell. Pick a different set of elements and use the above steps to determine the sensitivity and cross-talk of this new element combination. Determine the sensitivity and cross-talk of every element combination in the model and record the results. The element combination that gives the best sensitivity with the least amount of cross-talk will be the optimal load-cell.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for designing a load cell of an article, comprising the steps of:

selecting an article;

selecting transducer properties;

selecting loads applicable to the article including a primary load applied along a given axis, and including at least one selected off-axis secondary load;

performing a finite element analysis of the article to thereby provide a finite element model of the article comprising a predetermined number of finite elements, wherein each finite element has a respective principal strain axis and a respective principal strain angle responsive to the selected loads;

creating a mathematical Wheatstone bridge transducer for a plurality of combinations of finite elements, wherein each finite element comprises a mathematical strain gage;

orienting the mathematical strain gages of the mathematical Wheatstone bridge transducer in a first orientation relative to the principal strain angle so as to be generally optimally responsive to the primary load;

determining a first output voltage of the mathematical Wheatstone bridge transducer for each of the combinations of finite elements responsive to the primary load;

determining a second output voltage of the mathematical Wheatstone bridge transducer for each of the combinations of finite elements responsive to the at least one off-axis secondary load;

identifying which combinations of finite elements provide a selected range of highest first voltage output and provide a selected range of lowest second voltage output; and forming a load cell of the article by attaching to the article selected strain gages at an identified finite element combination, said selected strain gages to be wired into a Wheatstone bridge in the same manner that said mathematical strain gages are connectedly modeled in said mathematical Wheatstone bridge.

2. The method of claim 1, further comprising the step of eliminating from said plurality of combinations selected combinations which are physically unrealistic.

3. The method of claim 1, wherein the mathematical Wheatstone bridge comprises a four-arm Wheatstone bridge comprising first gage filaments having resistances $R_1$ and $R_2$ of a first strain gage at a first finite element of a finite element combination, and second gage filaments having resistances $R_3$ and $R_4$ of a second strain gage at a second finite element of the finite element combination;

wherein change in resistance is given by $dR=GF*e*R$, and wherein output voltage, $V_O$, of the four-arm Wheatstone bridge is given by $V_O=V*[(R_1+dR_1)/(R_1+dR_1+R_4+dR_4)-(R_2+dR_2)/(R_2+dR_2+R_3+dR_3)]$, wherein GF is a respective gage factor of the first and second strain gages, e is the strain respectively along the first and second gage filaments, R is the nominal strain gage resistance, respectively, of $R_1$, $R_2$, $R_3$, and $R_4$, dR is the change in resistance, respectively, of $dR_1$, $dR_2$, $dR_3$, and $dR_4$ due to the strain e, and V is the supply voltage to the four-arm Wheatstone bridge.

4. The method of claim 1, wherein said step of selecting transducer properties comprises selecting strain gage type, bridge size, shunt resistance, excitation voltage, gage resistance, and gage factor.

5. The method of claim 1, wherein said step of identifying comprises generating a finite element depiction of the article distinguishing the identified finite elements.

6. The method of claim 2, wherein the mathematical Wheatstone bridge comprises a four-arm Wheatstone bridge comprising first gage filaments having resistances $R_1$ and $R_2$ of a first strain gage at a first finite element of a finite element combination, and second gage filaments having resistances $R_3$ and $R_4$ of a second strain gage at a second finite element of the finite element combination;

wherein change in resistance is given by $dR=GF*e*R$, and wherein output voltage, $V_O$, of the four-arm Wheatstone bridge is given by $V_O=V*[(R_1+dR_1)/(R_1+dR_1+R_4+dR_4)-(R_2+dR_2)/(R_2+dR_2+R_3+dR_3)]$, wherein GF is a respective gage factor of the first and second strain gages, e is the strain respectively along the first and second gage filaments, R is the nominal strain gage resistance, respectively, of $R_1$, $R_2$, $R_3$, and $R_4$, dR is the change in resistance, respectively, of $dR_1$, $dR_2$, $dR_3$, and $dR_4$ due to the strain e, and V is the supply voltage to the four-arm Wheatstone bridge.

7. The method of claim 6, wherein said step of selecting transducer properties comprises selecting strain gage type, bridge size, shunt resistance, excitation voltage, gage resistance, and gage factor.

8. The method of claim 7, wherein said step of identifying comprises generating a finite element depiction of the article distinguishing the identified finite elements.

9. A method for designating location of a strain gage on a selected component, comprising the steps of:

selecting an article;

selecting transducer properties;

selecting loads applicable to the article including a primary load applied along a given axis at a given angle, and including at least one selected off-axis secondary load;

performing a finite element analysis of the article to thereby provide a finite element model of the article comprising a predetermined number of finite elements, wherein each finite element has a respective principal strain axis and a respective principal strain angle responsive to the selected loads;

creating a mathematical Wheatstone bridge transducer for a plurality of combinations of finite elements;

orienting the mathematical strain gages of the mathematical Wheatstone bridge transducer in a first orientation relative to the principal strain angle so as to be generally optimally responsive to the primary load;

determining a first output voltage of the mathematical Wheatstone bridge transducer for each of the combinations of finite elements responsive to the primary load;

determining a second output voltage of the mathematical Wheatstone bridge transducer for each of the combinations of finite elements responsive to the at least one off-axis secondary load; and identifying which combinations of finite elements provide a selected range of highest first voltage output and provide a selected range of lowest second voltage output.

10. The method of claim 9, further comprising the step of eliminating from said plurality of combinations selected combinations which are physically unrealistic.

11. The method of claim 9, wherein the mathematical Wheatstone bridge comprises a four-arm Wheatstone bridge comprising first gage filaments having resistances $R_1$ and $R_2$ of a first strain gage at a first finite element of a finite element combination, and second gage filaments having resistances $R_3$ and $R_4$ of a second strain gage at a second finite element of the finite element combination;

wherein change in resistance is given by $dR=GF*e*R$, and wherein output voltage, $V_O$, of the four-arm Wheatstone bridge is given by $V_O=V*[(R_1+dR_1)/(R_1+dR_1+R_4+dR_4)-(R_2+dR_2)/(R_2+dR_2+R_3+dR_3)]$, where GF is a respective gage factor of the first and second strain gages, e is the strain respectively along the first and second gage filaments, R is the nominal strain gage resistance, respectively, of $R_1$, $R_2$, $R_3$, and $R_4$, dR is the change in resistance, respectively, of $dR_1$, $dR_2$, $dR_3$, and $dR_4$ due to the strain e, and V is the supply voltage to the four-arm Wheatstone bridge.

12. The method of claim 9, wherein said step of selecting transducer properties comprises selecting strain gage type, bridge size, shunt resistance, excitation voltage, gage resistance, and gage factor.

13. The method of claim 9, wherein said step of identifying comprises generating a finite element depiction of the article distinguishing the identified finite elements.

14. The method of claim 9, wherein said step of selecting loads comprises selecting at least one of a vertical load, a lateral load, and a fore/aft load.

15. The method of claim 10, wherein the mathematical Wheatstone bridge comprises a four-arm Wheatstone bridge comprising first gage filaments having resistances $R_1$ and $R_2$ of a first strain gage at a first finite element of a finite element combination, and second gage filaments having resistances $R_3$ and $R_4$ of a second strain gage at a second finite element of the finite element combination;

wherein change in resistance is given by $dR=GF*e*R$, and wherein output voltage, $V_0$, of the four-arm Wheatstone bridge is given by $V_0=V*[(R_1+dR_1)/(R_1+dR_1+R_4+dR_4)-(R_2+dR_2)/(R_2+dR_2+R_3+dR_3)]$, wherein GF is a respective gage factor of the first and second strain gages, e is the strain respectively along the first and second gage filaments, R is the nominal strain gage resistance, respectively, of $R_1$, $R_2$, $R_3$, and $R_4$, dR is the change in resistance, respectively, of $dR_1$, $dR_2$, $dR_3$, and $dR_4$ due to the strain e, and V is the supply voltage to the four-arm Wheatstone bridge.

16. The method of claim 15, wherein said step of selecting transducer properties comprises selecting strain gage type, bridge size, shunt resistance, excitation voltage, gage resistance, and gage factor.

17. The method of claim 16, wherein said step of identifying comprises generating a finite element depiction of the article distinguishing the identified finite elements.

18. The method of claim 17, wherein said step of selecting loads comprises selecting at least one of a vertical load, a lateral load, and a fore/aft load.

* * * * *